(12) United States Patent
Chandra et al.

(10) Patent No.: US 11,622,029 B2
(45) Date of Patent: Apr. 4, 2023

(54) OPTIMIZING INFORMATION TRANSMITTED OVER A DIRECT COMMUNICATIONS CONNECTION

(71) Applicant: International Business Machines Corporation, Armonk, NY (US)

(72) Inventors: Anuj Chandra, Pune (IN); Subhojit Roy, Pune (IN); Kushal S. Patel, Pune (IN); Sarvesh S. Patel, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/443,935

(22) Filed: Jul. 28, 2021

(65) Prior Publication Data

US 2023/0045698 A1 Feb. 9, 2023

(51) Int. Cl.
*H04L 69/22* (2022.01)

(52) U.S. Cl.
CPC ................... *H04L 69/22* (2013.01)

(58) Field of Classification Search
None
See application file for complete search history.

(56) References Cited

U.S. PATENT DOCUMENTS

| 6,847,645 | B1 | 1/2005 | Potter et al. |
| 6,952,421 | B1 | 10/2005 | Slater |
| 11,095,659 | B2 * | 8/2021 | Schirdewahn .......... G06F 21/30 |
| 11,389,733 | B1 * | 7/2022 | Labate .................. A63F 13/795 |
| 2011/0188633 | A1 * | 8/2011 | Ohta ........................ H05G 1/10 |
| | | | 378/102 |
| 2018/0026917 | A1 | 1/2018 | Ran et al. |
| 2020/0259713 | A1 | 8/2020 | Robitaille et al. |
| 2020/0280428 | A1 | 9/2020 | Kovacs et al. |

FOREIGN PATENT DOCUMENTS

WO 2020160564 A1 8/2020

OTHER PUBLICATIONS

Anonymous, "NIST Cloud Computing Program," NIST, Information Technology Laboratory, Nov. 13, 2013, pp. 1-2, retrieved from www.nist.gov/itl/cloud/.
Mell et al., "The NIST Definition of Cloud Computing," Version 15, Oct. 7, 2009, pp. 1-2.
Mell et al., "The NIST Definition of Cloud Computing," Recommendations of the National Institute of Standards and Technology, NIST Special Publication 800-145, Sep. 2011, pp. 1-7.
CSRC, "Cloud Computing," Computer Security Resource Center, Oct. 2017, 3 pages, retrieved from https://csrc.nist.gov/projects/cloud-computing.

* cited by examiner

*Primary Examiner* — James A Edwards
(74) *Attorney, Agent, or Firm* — Zilka-Kotab, P.C.

(57) ABSTRACT

A computer-implemented method according to one embodiment includes identifying that a direct communications connection exists between a first device and a second device; and optimizing information transmitted between the first device and the second device over the direct communications connection.

20 Claims, 6 Drawing Sheets

OPTIMIZING INFORMATION TRANSMITTED OVER A DIRECT COMMUNICATIONS CONNECTION

BACKGROUND

The present invention relates to data communications, and more particularly, this invention relates to optimizing information transmitted over a direct communications connection.

Data networks are commonly used to transfer data between devices. However, because there are many different network protocols which are widely used for data transfer, additional fields are added to packets to ensure correct routing, congestion control, security, etc. In the case where two devices are directly connected without any intermediary devices between them, many of these additional fields are unnecessary and create an additional protocol overhead to communications between these devices.

BRIEF SUMMARY

A computer-implemented method according to one embodiment includes identifying that a direct communications connection exists between a first device and a second device; and optimizing information transmitted between the first device and the second device over the direct communications connection.

According to another embodiment, a computer program product includes one or more computer readable storage media, and program instructions collectively stored on the one or more computer readable storage media, the program instructions including instructions configured to cause one or more processors to perform a method including identifying, by the one or more processors, that a direct communications connection exists between a first device and a second device; and optimizing, by the one or more processors, information transmitted between the first device and the second device over the direct communications connection.

According to another embodiment, a system includes a processor; and logic integrated with the processor, executable by the processor, or integrated with and executable by the processor, where the logic is configured to identify that a direct communications connection exists between a first device and a second device; and optimize information transmitted between the first device and the second device over the direct communications connection.

Other aspects and embodiments of the present invention will become apparent from the following detailed description, which, when taken in conjunction with the drawings, illustrate by way of example the principles of the invention.

DETAILED DESCRIPTION

Figure 1:
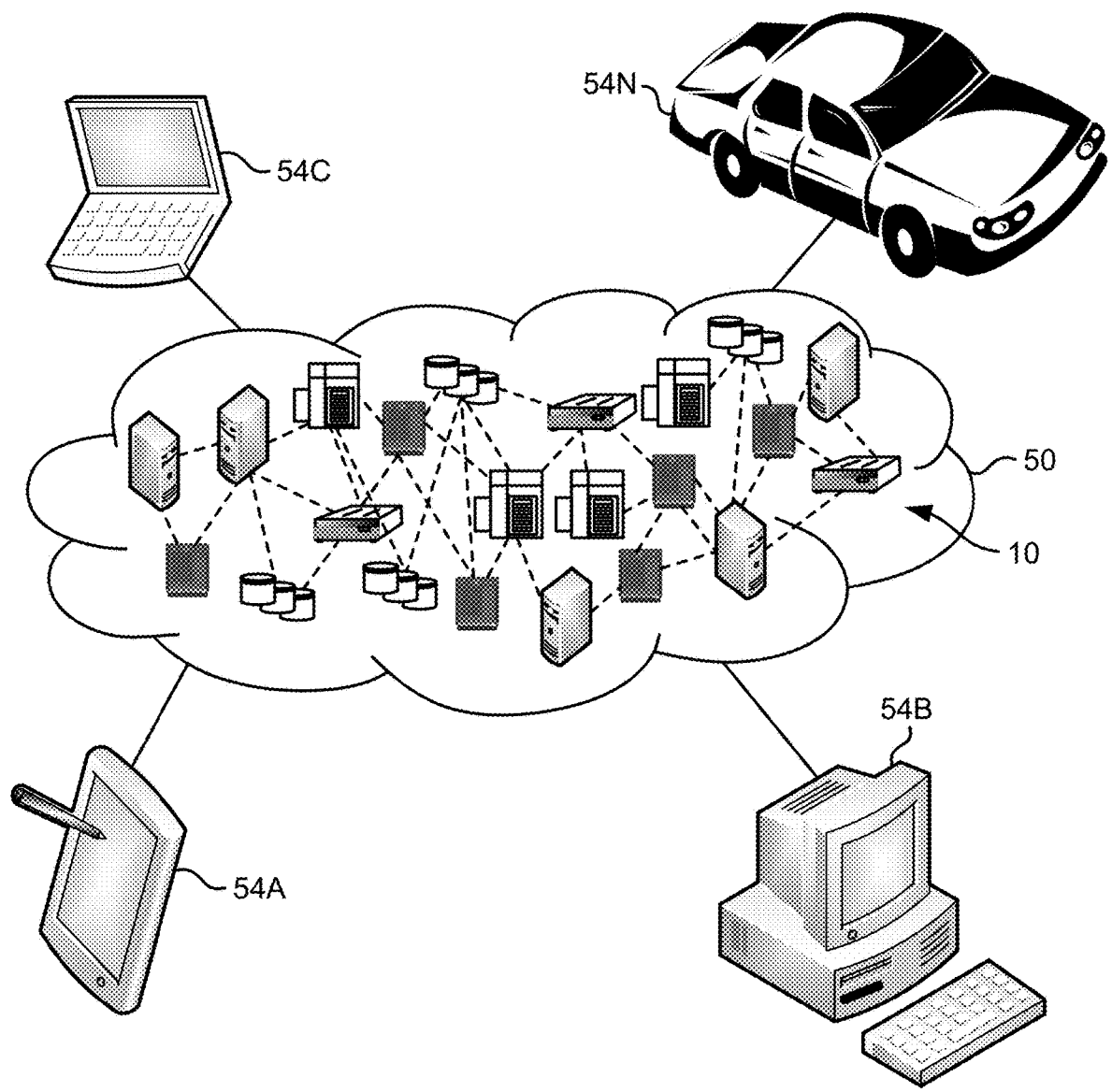
FIG. 1 depicts a cloud computing environment in accordance with one embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several embodiments of optimizing information transmitted over a direct communications connection.

In one general embodiment, a computer-implemented method includes identifying that a direct communications connection exists between a first device and a second device; and optimizing information transmitted between the first device and the second device over the direct communications connection.

In another general embodiment, a computer program product includes one or more computer readable storage media, and program instructions collectively stored on the one or more computer readable storage media, the program instructions including instructions configured to cause one or more processors to perform a method including identifying, by the one or more processors, that a direct communications connection exists between a first device and a second device; and optimizing, by the one or more processors, information transmitted between the first device and the second device over the direct communications connection.

In another general embodiment, a system includes a processor; and logic integrated with the processor, executable by the processor, or integrated with and executable by the processor, where the logic is configured to identify that a direct communications connection exists between a first device and a second device; and optimize information transmitted between the first device and the second device over the direct communications connection.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
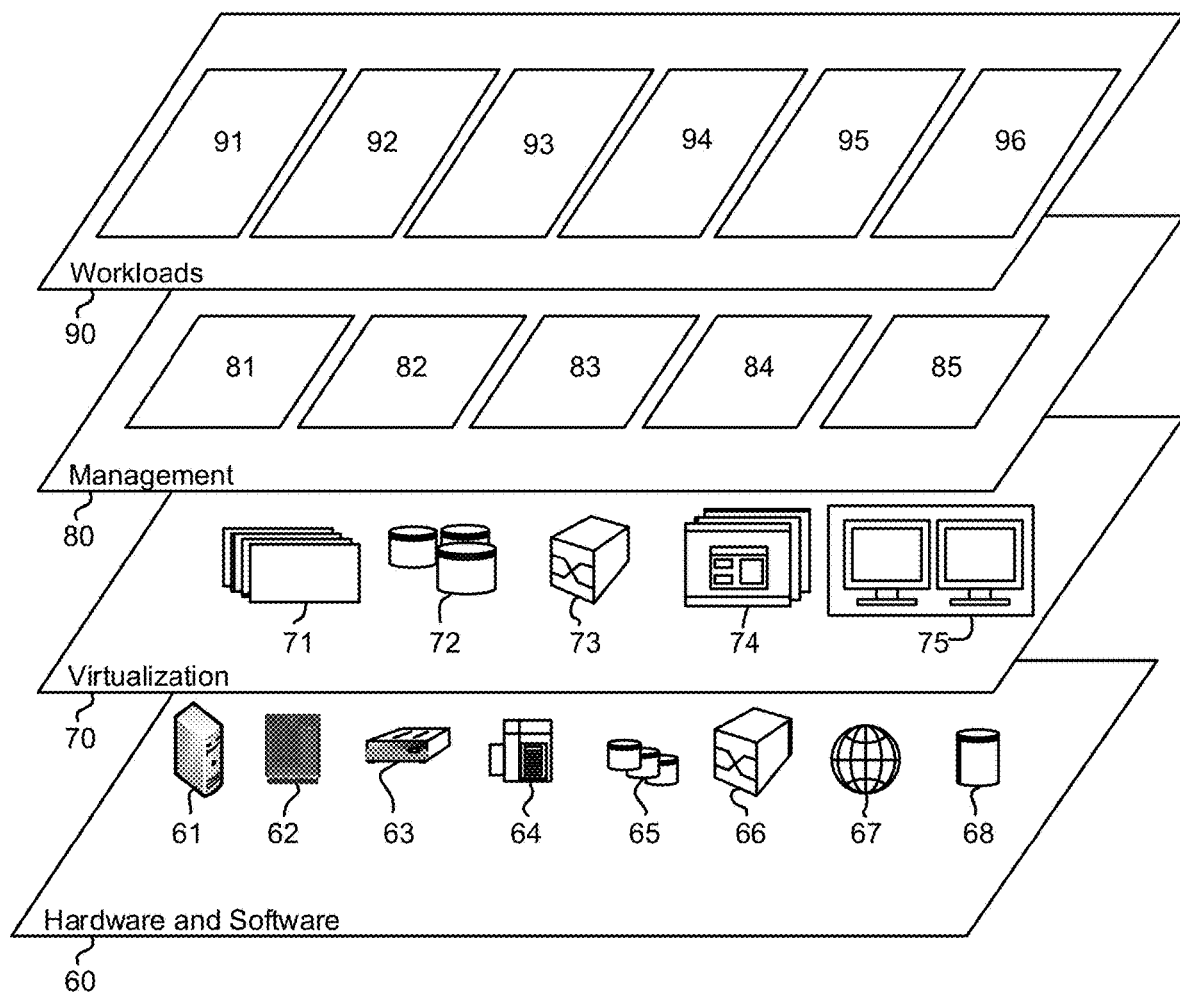
FIG. 2 depicts abstraction model layers in accordance with one embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and message authentication 96.

Figure 3:
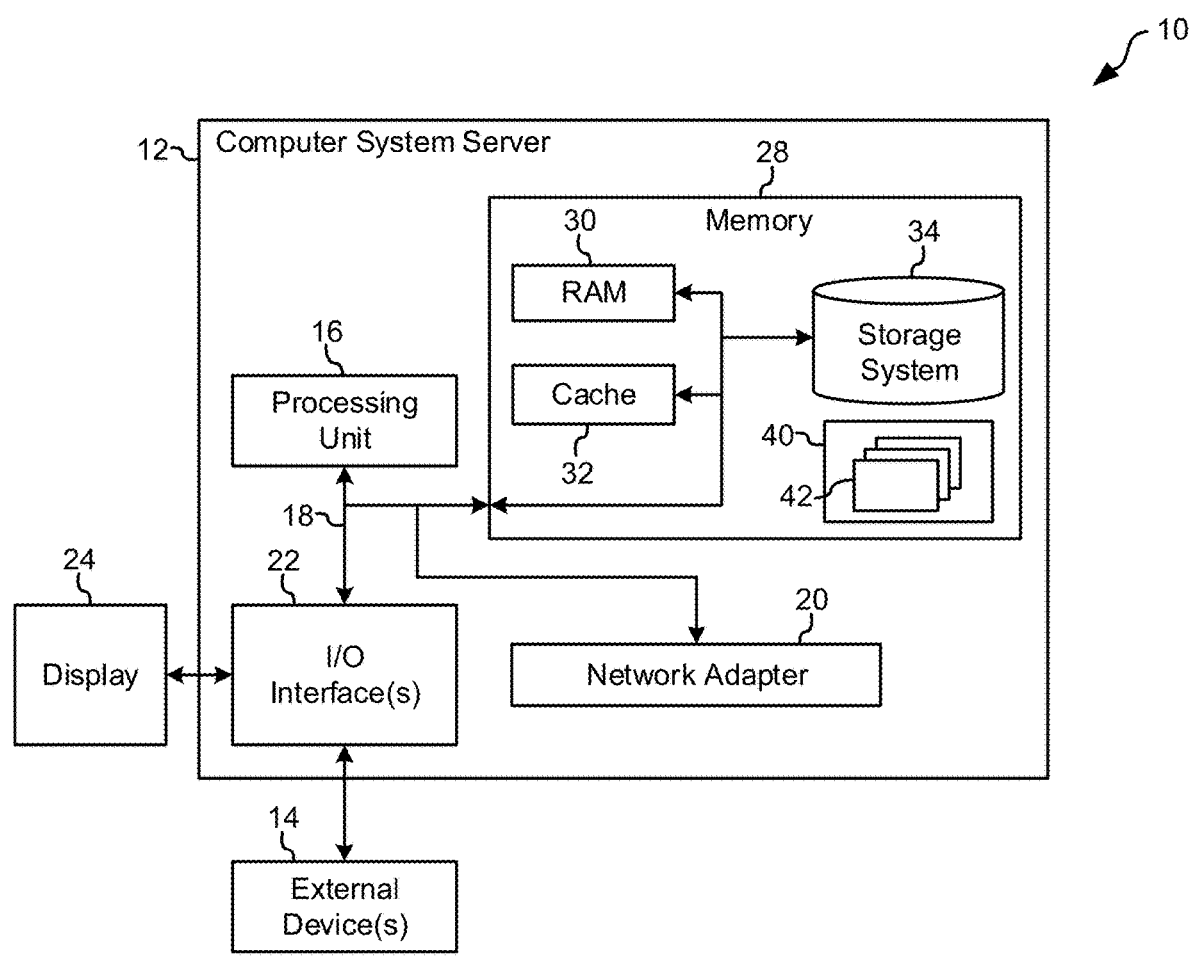
FIG. 3 depicts a cloud computing node in accordance with one embodiment of the present invention.

Referring now to FIG. 3, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 4:
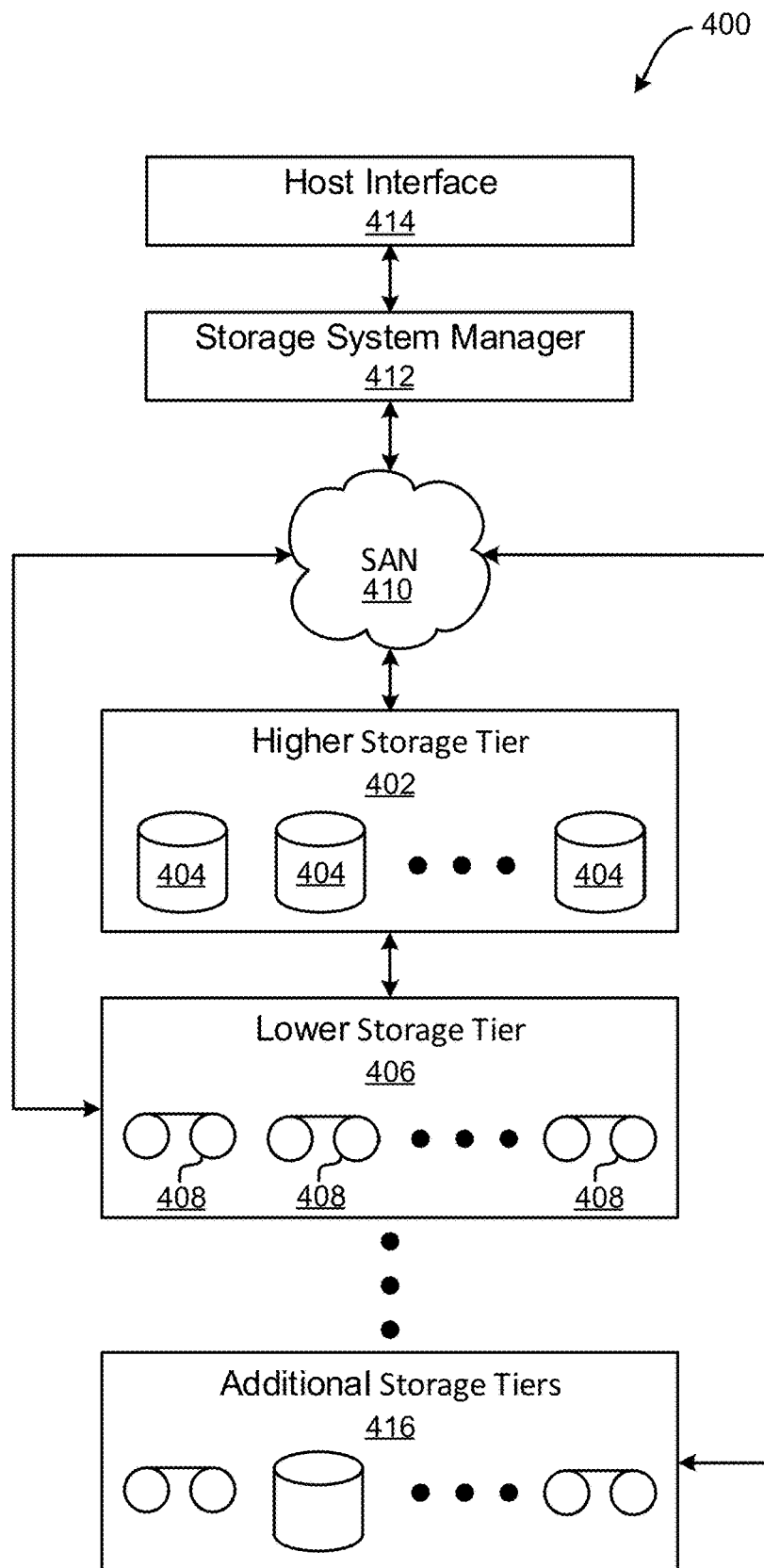
FIG. 4 illustrates a tiered data storage system in accordance with one embodiment of the present invention.

Now referring to FIG. 4, a storage system 400 is shown according to one embodiment. Note that some of the elements shown in FIG. 4 may be implemented as hardware and/or software, according to various embodiments. The storage system 400 may include a storage system manager 412 for communicating with a plurality of media on at least one higher storage tier 402 and at least one lower storage tier 406. The higher storage tier(s) 402 preferably may include one or more random access and/or direct access media 404, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 406 may preferably include one or more lower performing storage media 408, including sequential access media such as magnetic tape in tape drives and/or optical media, slower accessing HDDs, slower accessing SSDs, etc., and/or others noted herein or known in the art. One or more additional storage tiers 416 may include any combination of storage memory media as desired by a designer of the system 400. Also, any of the higher storage tiers 402 and/or the lower storage tiers 406 may include some combination of storage devices and/or storage media.

The storage system manager 412 may communicate with the storage media 404, 408 on the higher storage tier(s) 402 and lower storage tier(s) 406 through a network 410, such as a storage area network (SAN), as shown in FIG. 4, or some other suitable network type. The storage system manager 412 may also communicate with one or more host systems (not shown) through a host interface 414, which may or may not be a part of the storage system manager 412. The storage system manager 412 and/or any other component of the storage system 400 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 400 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 402, may include a majority of SSD storage media for storing data in a higher performing storage environment, and remaining storage tiers, including lower storage tier 406 and additional storage tiers 416 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 402, while data not having one of these attributes may be stored to the additional storage tiers 416, including lower storage tier 406. Of course, one of skill in the art, upon reading the present descriptions, may devise many other combinations of storage media types to implement into different storage schemes, according to the embodiments presented herein.

According to some embodiments, the storage system (such as 400) may include logic configured to receive a request to open a data set, logic configured to determine if the requested data set is stored to a lower storage tier 406 of a tiered data storage system 400 in multiple associated portions, logic configured to move each associated portion of the requested data set to a higher storage tier 402 of the tiered data storage system 400, and logic configured to assemble the requested data set on the higher storage tier 402 of the tiered data storage system 400 from the associated portions.

Of course, this logic may be implemented as a method on any device and/or system or as a computer program product, according to various embodiments.

Figure 5:
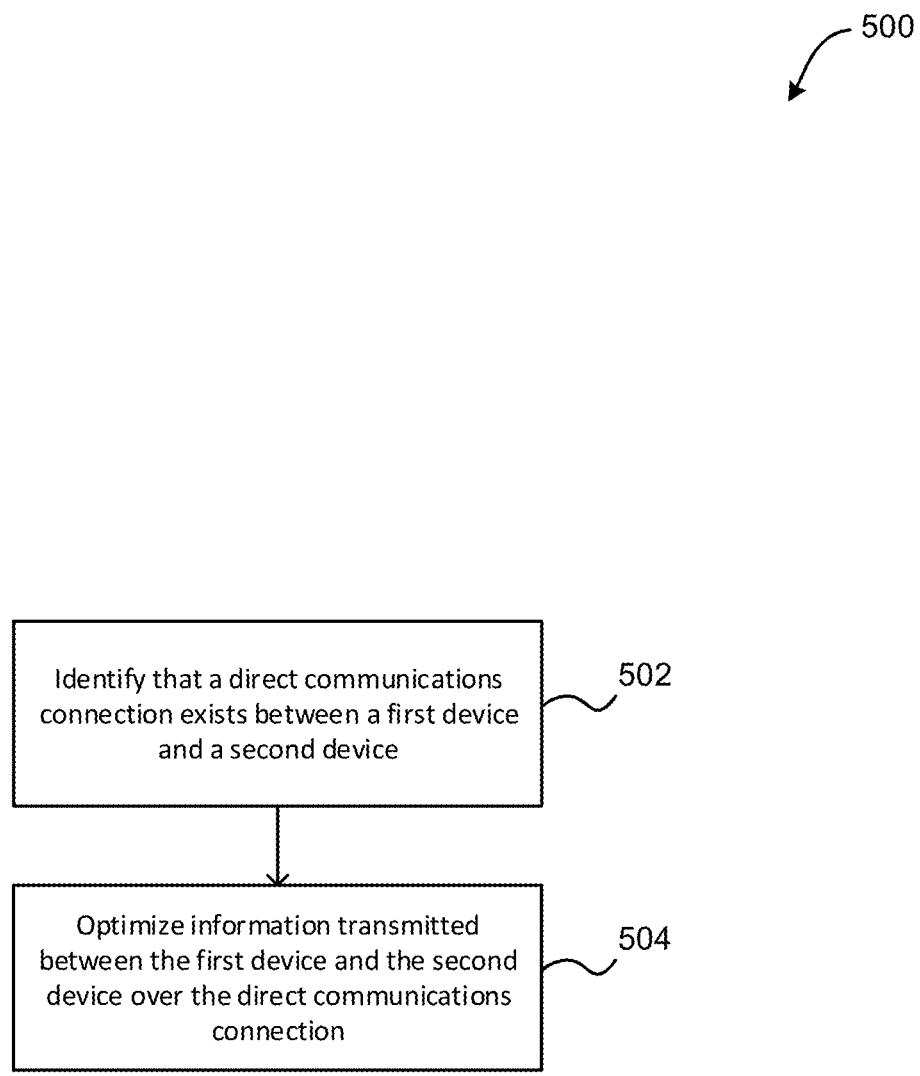
FIG. 5 illustrates a flowchart of a method for optimizing information transmitted over a direct communications connection, in accordance with one embodiment of the present invention.

Now referring to FIG. 5, a flowchart of a method 500 is shown according to one embodiment. The method 500 may be performed in accordance with the present invention in any of the environments depicted in FIGS. 1-4 and 6, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where it is identified that a direct communications connection exists between a first device and a second device. In one embodiment, the first device and the second device may each include a computing device (e.g., a server, a desktop computer, a laptop computer, etc.). In another embodiment, a direct communications connection may include a hardwired communications connection running directly between the first and second device with no intermediary devices between the first device and the second device.

Additionally, in one embodiment, the first device may include a transmitting device, and the second device may include a receiving device. For example, the first device may transmit information to the second device over the direct communications connection. In another embodiment, the hardwired connection may include a network communications cable (e.g., a copper cable, an optical cable, etc.).

Further, in one embodiment, the direct communications connection may include a direct network communication (e.g., a direct attached ethernet connection, etc.). In another embodiment, the direct communications connection may be determined by calculating a network distance between the first device and the second device. For example, a hop count may be determined for the communications connection from the first device to the second device, or from the second device to the first device. In another example, if it determined that the hop count for the communications connection between the first device and second device has a value of one, it may be determined that the communications connection is a direct communications connection.

Further still, in one embodiment, the direct communications connection may be determined by identifying and comparing identifiers of communications cable end points. In another embodiment, the first device may determine identifiers for all communications cables currently connected to the first device, and the second device may determine identifiers of all communications cables currently connected to the second device.

For example, each communications cable may include a network communications cable. In another example, each communications cable may contain identifying information (e.g., an identifier) that can be determined at each endpoint where the communications cable is connected. In yet another example, a query can be sent to each communications port of a device to request an identifier of a cable inserted into each communications port of the device.

Also, in one embodiment, the first device may send to the second device identifiers of all communications cables currently connected to the first device. In another embodiment, the second device may send to the first device identifiers of all communications cables currently connected to the second device. In yet another embodiment, upon receiving identifiers of all communications cables currently connected to the second device, the first device may compare the received identifiers to identifiers of all communications cables currently connected to the first device.

For example, if an identifier of a communications cable currently connected to the second device matches an identifier of a first communications cable currently connected to the first device, the first device may identify the first communications cable as a direct communications connection between the first device and the second device.

Likewise, in one embodiment, upon receiving identifiers of all communications cables currently connected to the first device, the second device may compare the received identifiers to identifiers of all communications cables currently connected to the second device. For example, if an identifier of a communications cable currently connected to the first device matches an identifier of a first communications cable currently connected to the second device, the second device may identify the first communications cable as a direct communications connection between the second device and the first device.

In addition, method 500 may proceed with operation 504, where information transmitted between the first device and the second device over the direct communications connection is optimized. In one embodiment, the information may be optimized in response to identifying the existence of the direct communications connection. In another embodiment, information transmitted from the first device to the second device over the direct communications connection may be packaged as one or more frames.

For example, when an instance of data is desired to be communicated from the first device to the second device, the first device may add protocol information to the instance of data to create a frame. In another example, the frame may then be sent from the first device to the second device over the direct communications connection. In yet another example, the second device may then identify and remove the protocol information from the received frame to obtain the instance of data.

Furthermore, in one embodiment, optimizing the information that is transmitted may include determining one or more fields to be added by the first device to data transmitted from the first device to the second device via the direct communications connection and subsequently removed from the data received by the second device via the direct communications connection. In another embodiment, optimizing the information that is transmitted may include determining one or more fields to be omitted from data transmitted from the first device to the second device via the direct communications connection.

Further still, in one embodiment, in response to identifying the direct communications connection, the first device and the second device may perform one or more handshaking operations. In another embodiment, during the handshaking operations, the first device and the second device may determine which fields the first device is to add to data communicated to the second device via the direct communications connection, and which fields the first device is to omit from data communicated to the second device via the direct communications connection (e.g., during frame creation).

Also, in one embodiment, during the handshaking operations, the first device and the second device may determine that only information necessary for the direct communications connection is to be added to data communicated between the devices via the direct communications connection, and information utilized only for an indirect communications connection may be omitted from the data communicated between the devices via the direct communications connection. In another embodiment, during the handshaking operations, the first device and the second device may determine that the information necessary for the direct communications connection includes one or more of: a maximum transmission unit (MTU) value indicating a size of the largest protocol data unit (PDU) that can be communicated in a single transaction over the direct communications connection, one or more fields and/or flags necessary to implement communications over the direct communications connection, etc.

For example, this information may be added to data communicated from the first device to the second device via the direct communications connection. In another example, this information may be removed from data received by the second device from the first device to the second device via the direct communications connection.

Additionally, in one embodiment, during the handshaking operations, the first device and the second device may determine that the information utilized only for an indirect communications connection includes one or more of: routing information, addressing information, fragmentation information, new timestamp information, security information, source and/or destination address information, and checksum information. For example, this information may be omitted from data communicated between the devices via the direct communications connection.

Further, in one embodiment, data may be transmitted from the first device to the second device over the direct communications connection, utilizing the optimized information. For example, the first device may add the information determined to be necessary for the direct communications connection to the data to create frames communicated from the first device to the second device via the direct communications connection. In another example, the first device may omit the information determined to be utilized only for an indirect communications connection from frames communicated from the first device to the second device via the direct communications connection. In yet another example, upon receiving the frames from the first device via the direct communications connection, the second device may remove the information determined to be necessary for the direct communications connection from the frames to obtain the data.

Further still, in one embodiment, in response to determining that an indirect communications connection exists between the first device and the second device, the first device and the second device may communicate and may determine that information utilized only for an indirect communications connection may be included within from the data communicated between the devices via the indirect communications connection.

In this way, a number of fields added to data being transmitted over a connection may be minimized in response to determining that the network is a direct communications connection. This may also reduce a number of fields that need to be removed from received data. This may reduce an amount of processing needed by both a transmitting device that sends the data and a receiving device that received the data, which may improve a performance of both devices. This may also minimize an amount of data being transmitted over the connection, which may reduce traffic on the connection.

Figure 6:
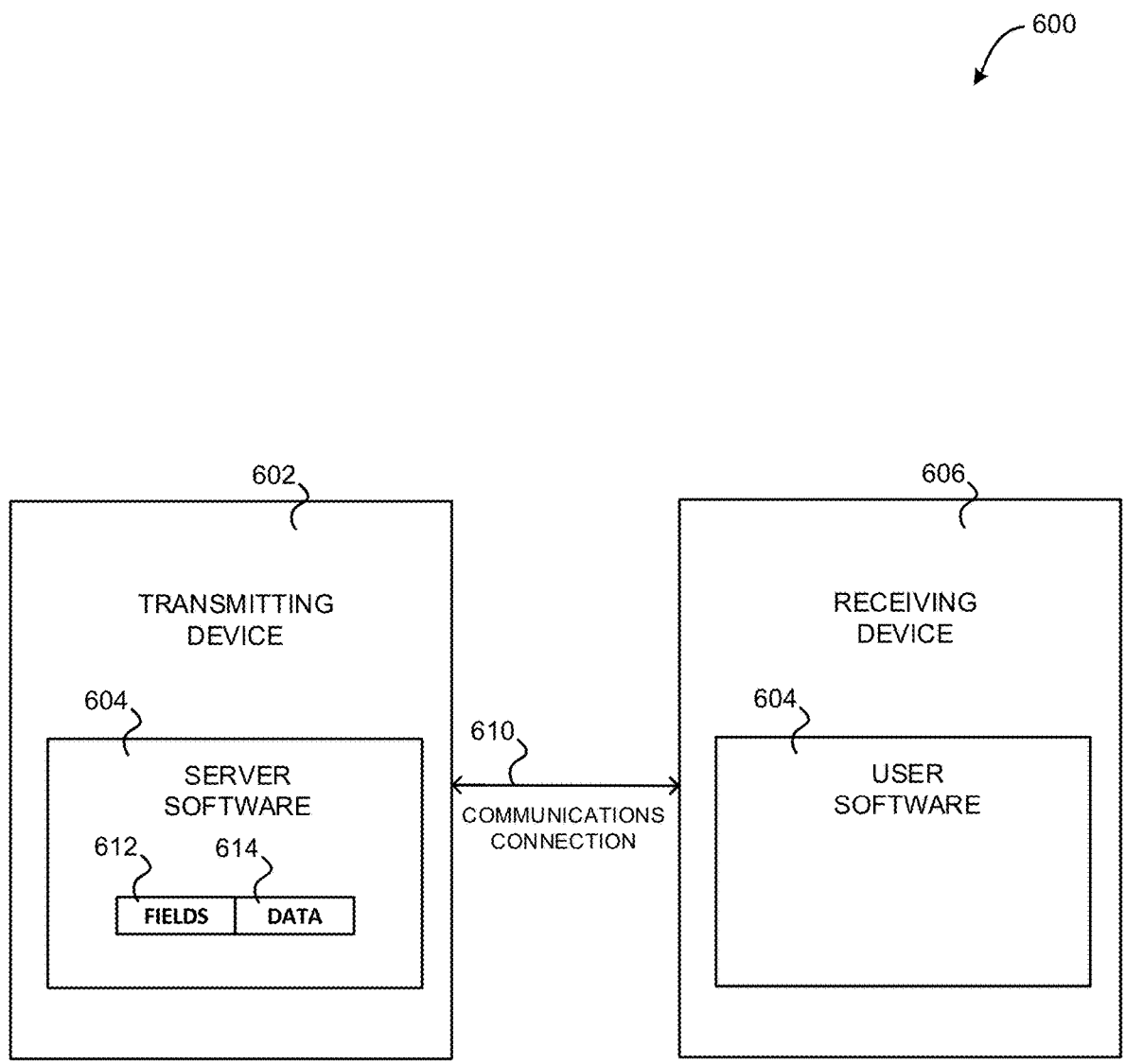
FIG. 6 illustrates an exemplary communications network environment, in accordance with one embodiment of the present invention.

FIG. 6 illustrates an exemplary communications network environment 600, according to one exemplary embodiment. As shown, a transmitting device 602 is in communication with a receiving device 606 via a communications connection 610. In one embodiment, the transmitting device 602 and/or the receiving device 606 may determine that the communications connection 610 is a direct communications connection.

For example, the transmitting device 602 may send to the receiving device 606 a first identifier of a communications cable implementing the communications connection 610 with the receiving device 606. Likewise, the receiving device 606 may send to the transmitting device a second identifier of the communications cable implementing the communications connection 610 with the transmitting device 602. Upon determining that the first identifier matches the second identifier, both the transmitting device 602 and the receiving device 606 may determine that the communications connection 610 is a direct communications connection.

In response to determining that the communications connection 610 is a direct communications connection, the transmitting device 602 may perform one or more handshaking operations with the receiving device 606 to determine direct communications fields 612 to be added by the transmitting device 602 to data 614 communicated to the receiving device 606 via the communications connection 610.

Additionally, before the data 614 is sent to the receiving device 606, server software 604 of the transmitting device 602 adds the direct communications fields 612 to the data 614 to create a frame. It should be noted that the direct communications fields 612 can be prepended and/or appended to the data 614 by the server software 604. The frame is then converted to bits by the server software 604 and transmitting over the communications connection 610 to user software 608 of the receiving device 606, where the bits are converted back to the frame, and the direct communications fields 612 are removed from the frame to obtain the data 614 at the receiving device.

In this way, only direct communications fields 612 may be used for data communications between the transmitting device 602 and the receiving device 606 via the communications connection 610, which may minimize an amount of processing performed by such devices and may therefore improve a performance of such devices.

Negotiating Direct Attached Mode Between Two Systems in Ethernet Network and Applying the Method to Improve CPU and Bandwidth Utilization In one embodiment, a message authentication code (MAC) is inserted into the formatting of sufficiently compressible data. The addition of a MAC makes the data stored more resilient against manipulation, as the ciphertext is no longer malleable. More specifically, it becomes infeasible to replace part of the ciphertext of an encrypted sector which is protected by this MAC.

Data networks are included within a wide area of technology which is deployed in multiple forms and topologies across the world. Many network topologies are different from each other and are based on requirements which can be completely different from other network topologies. There are multiple network protocols which are widely used for data transfer (e.g., TCP/IP, RDMA, iSER, iWARP, RoCE, etc.).

In any layered network stack, there are many fields which are introduced for the packets to get routed correctly towards their destination. To ensure this correct routing, additional fields are introduced such as checksums, frame counters, additional encryption layers, frame counts, additional sequencing checks, etc. These checks are primarily needed when a packet traverses multiple hops in a network consisting of multiple network elements (such as local LAN or WAN or SAN segments including routers, switches, forwarders, protocol changers such as FCIP routers, tunnelling entities, forwarding layers, etc.). While going through one or more layers, the packets maybe subjected to collision and/or congestion, routing loops, etc., before arriving at one or more network endpoints. Extra fields may also be introduced in data networks to enable additional security to prevent packet replacement, replays and drops. This causes a protocol overhead in all the cases.

In the case when two communicating entities are directly connected (e.g., without any other network element such as switches, routers, forwarders, etc.), these entities may be considered directly attached or point to point. In other words, they can be considered to be in a physically isolated environment where there is little or no risk of congestion, collision, packet drops, etc. as the entities are directly attached. As a result, mechanisms which manage issues such as congestion, collision and, packet drops create an overhead on the overall throughput of data transfer as well as system performance as it requires multiple CPU cycles to compute these extra fields. Also, depending on the nature of the protocol, these overheads tend to be applied in multiple layers which causes multi-fold performance impact.

In response to the above issues, the following steps may be performed:

1. Identifying if a connection is a direct attach ethernet connection.
2. Checking and cognitively deciding which portions of the frames should be eliminated and which should be maintained without adjustment in order to maintain an efficient data transfer.
3. Modifying the frames and creating a communication model between the two directly connected entities before removing the frames' unnecessary parts.
4. Introducing the removed frame parts as necessary based on the analysis.

Ethernet-attached data centers are widely implemented for on-premise and off-premise cloud implementations. There is no easy way to identify whether a connection is a directly attached connection or a fabric attached connection using an ethernet protocol.

In response, a direct attached connection can be identified using special messages where the hardware related data gets exchanged between connections. This hardware data is vendor specific in nature and contains unique identifiers like the serial number of an SFP (Small Factor Pluggable) module or a copper cable which is unique and is assigned by the SFP or cable vendor. This data is then used to identify whether there are multiple entities between two ethernet connections.

Unnecessary calculations and burdens may be removed from network frames which are used in directly attached ethernet connections. For example, a method may identify a direct attached ethernet connection and help improve the data transfer rates and the system performance by improving data frame sizes and reducing unnecessary calculations which may further reduce the CPU usage and improve overall system performance as the saved CPU cycles will be used to perform other computations.

Further, in one embodiment, offload engines may include hardware-based accelerators which perform the protocol offloading using hardware components on the adapters. Offload engines such as TCP Offload Engines (TOE) may be are used in the iSCSI and iSER connections. These offload engines may be used for SAN boot applications which require very high data transfer rates and speed in order to maintain the same user experience when compared to in-house booted applications. In this way, SAN Boot performance of an Ethernet attached system may be improved.

In this way, the overall system performance will be improved.

To identify if a connection is a direct attach ethernet connection, in one embodiment, directly attached cable information may be exchanged between end nodes and a decision will be made as to whether the connection is a direct attached one or a fabric attached one. Two examples of cables may include copper cables and active optical cables.

In another embodiment, frame parts may be removed as necessary. One exemplary implementation is shown via the following steps:

1. Each of the protocol layers adds a header to the payload generated by the layer above it.
   A. The headers may be of fixed of variable sizes. Some of the fields are static fields which are known to the system, while others are computed based on the payload being encapsulated.
   B. This requires computational resources and adds to the overall latency of the communication.
2. On the receiving end, the ethernet frame is received by the physical layer (the adapter) and handed over to the MAC layer.
   A. The MAC layer removes the MAC header, performs the necessary checks and hands the IP datagram to the network layer (Internet Protocol).
   B. The network layer (IP) check if the destination IP matches its own IP address, strips the IP header and passes the payload the transport layer.
   C. The transport layer (TCP) takes the TCP segment and performs the Windowing, flow control, out-of-sequence checks using the fields in the TCP header, strips the TCP header and sends the packet up to the session layer.
3. As in step 2, each layer de-encapsulates the payload and validates the payload defined by the parameters in the protocol header before passing it up to the layer above it.
   A. This requires computational resources and adds to the overall latency of the communication.

When a direct attach mode is detected utilizing an Internet Protocol (IP), the following fields may be omitted:

Routing information: If it is known that there is point to point connectivity between two network entities without any routing/switching elements in between, then the elements in the IP header for routing are not required. This may include fields such as Type of Service (8 bits) and The Time to Live (8 bits) fields.

Information to Manage Fragmentation: Fragmentation and reassembly are needed when transmitting data through small packet networks. When two hosts are connected together by a point to point connection without any routing or switching elements, they can pre-agree on the size of the packets/datagrams. The transmitter does not need to fragment packets and the receiver does not need to reassemble packets. This may include fields such as Identification (16 bits) and Fragmentation Offset (13 bits) fields.

Timestamps: Timestamps may be retained or reused from a ULP header. If omitted they can contribute to space saved.

Security: Security is an optional field and the requirement for the same further weakens in a tightly coupled direct attach systems with point to point connections without any interconnecting elements.

Special routing: No kind of routing information is needed.

Source Address and Destination Address: The source and destination address are primarily used for routing decisions. For any other requirements the source and destination addresses can be exchanged between the communicating applications as part of the initial handshake during or post connection establishment and are not needed to be passed in every datagram carrying the main data traffic payload.

Flags: Flags are used to indicate fragmentation and hence can be omitted.

TCP is the primary transport protocol used to provide reliable, full-duplex connections. The most common use of TCP is to exchange TCP data encapsulated in an IP datagram. Although IP is implemented on both hosts and routers, TCP is typically implemented on hosts only to provide reliable end-to-end data delivery. The unit of transfer between the TCP software on two machines is called a TCP segment. Segments are exchanged to establish connections, transfer data, send acknowledgements, advertise window sizes and close connections.

When two devices are direct-attached without switching and routing elements, and the devices are in a protected environment, there is no chance of misrouting and damage. Hence there is no need for a TCP checksum to be computed and placed. It would save the computational overhead for every TCP segment incurred in computing the checksum. If the TCP header could be modified to omit the checksum then a 2 byte saving per TCP segment could be achieved.

Exemplary Process

An exemplary implementation is as follows:
1. The hop count of existing devices in a network segment may be determined.
   A. Assume a network containing 5 devices: A, B, C, D, E
   B. Device A sends out a hop probe on its local network segment and the response indicates the following hop counts per device, as shown in Table 1:
   C.

TABLE 1

| Device | Hop Count |
| --- | --- |
| B | 2 |
| C | 1 |
| D | 3 |
| E | 2 |

D. A hop count of 1 indicates a direct attached or point to point connectivity between endpoint of the associated devices without any fabric switching/routing elements in between. Therefore, the device sending the hop probe can draw an inference and store the same in a local database. The database stores a device name and hop count along with a MAC address and IP address, as shown in Table 2.

E.

TABLE 2

| Device | Hop Count | Connectivity Inference | MAC | IP Address |
|---|---|---|---|---|
| B | 2 | Switched | | |
| C | 1 | Direct | | |
| D | 3 | Switched | | |
| E | 2 | Switched | | |

F. The above procedure can be repeated by each entity on the network to create its own local database of devices, hop counts, endpoint IP addresses, and MAC addresses.
G. In another embodiment, a centralized database may be set up to hold hop counts between different devices and device endpoints, as shown in Table 3.

H.

TABLE 3

| Device 1 | Device 2 | Hop Count | Connectivity Inference | MAC | IP Address |
|---|---|---|---|---|---|
| B | A | 2 | Switched | 00:1B:44:11:3A:B7 | 192.168.10.11 |
| C | A | 1 | Direct | 00:1C:44:13:3A:B5 | 192.168.11.21 |
| D | A | 3 | Switched | 00:1B:44:10:3A:A4 | 192.168.11.31 |
| E | A | 2 | Switched | 1F:1C:1D:20:3A:C7 | 192.168.11.41 |

2. When a device X wants to establish communication with another device Y, then it will first do a reverse lookup in the local table or a global table as defined above using an IP address or MAC address.
   A. E.g., if device A with endpoint A1 having IP address of 192.168.11.51 and MAC 00:1C:54:11:3A:07 wants to establish a TCP session with device B with endpoint having IP Address 192.168.11.21, it will do look up the local or global database and find that the hop count is 2.
   B. Since the hop count is 2, the connection will be set up through the TCP/IP stack as is done currently. The I/O traffic will use each and every layer with all the fields and options including computation of protocol layer specific checksums and fields used for routing and fragmentation will be used.
   C. If however, device A with endpoint A1 having IP address of 192.168.11.51 and MAC 00:1C:54:11:3A:07 wants to establish a TCP session with device C with endpoint having IP Address 192.168.11.31, it will do look up the local or global database and find that the hop count is 1.
      i. Since the hop count is 1, the device A gets to know that it has a direct attach connection with device C without any routing or switching elements in between.
      ii. Following the same steps, device C gets to know that it has direct attach connection to device A.
      iii. An application on Device A then sends a first connection request through Device C. The request traverses down the TCP/IP stack of device A without any optimizations, across the wire and up the TCP/IP stack of device C without any optimizations.
      iv. Applications on both devices then do the basic handshaking for protocol optimizations to be used. This could include:
         a. The MTU value used by both ends
         b. The negotiation of fields to be dropped in the exchanges
         c. Checksums to be omitted
         d. Optional fields and flags which are required, and
         e. IP addresses, port numbers to be used if more than is configured on the communicating ports.
   D. The above negotiation could be defined as individual protocol specific fields or groups of fields defined by service classes.
   E. Each end could subsequently decide how to implement the optimizations
      i. The standard TCP/IP drivers are modified such that they can be signaled to carry out optimizations till the signal to stop optimization is given. The same driver is used for communication with devices which have hop count 1 and which have hop count >1. The drivers are signaled by upper layers to choose optimized vs non-optimized mode of operation for every connection.
      ii. The systems can have different set of TCP/IP drivers. One set of drivers handles standard un-optimized traffic and another set of drivers handles optimized traffic.
   F. In either system described in 2.2.6, it is the upper layers responsibility to send the exchanges for connection establishment, closure and recovery through the unoptimized path and the traffic post the connection establishment and handshaking and before connection closure through the optimized path.

In one embodiment, a method and/or apparatus is provided for streamlining the protocols for routing communication packets and/or frames between a target and an initiator when a direct ethernet connection exists. In one embodiment, it may be detected whether a direct connection exists between an initiator and a target in a data processing system using ethernet networks. The communication packets and protocols between the initiator and target may then be modified to remove excess protocols associated with switched communication networks, thereby improving the system performance.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement embodiments of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
identifying that a direct communications connection exists between a first device and a second device; and
optimizing information transmitted between the first device and the second device over the direct communications connection,
wherein optimizing the information that is transmitted includes:
determining one or more fields to be added by the first device to data transmitted from the first device to the second device via the direct communications connection and subsequently removed from the data received by the second device via the direct communications connection, and
determining one or more fields to be omitted from data transmitted from the first device to the second device via the direct communications connection.

2. The computer-implemented method of claim 1, wherein the direct communications connection includes a hardwired communications connection running directly between the first and second device with no intermediary devices between the first device and the second device.

3. The computer-implemented method of claim 1, wherein the direct communications connection is determined by identifying and comparing identifiers of communications cable end points.

4. The computer-implemented method of claim 1, wherein the direct communications connection is determined by calculating a network distance between the first device and the second device.

5. The computer-implemented method of claim 1, further comprising transmitting data from the first device to the second device over the direct communications connection, utilizing the optimized information.

6. A system, comprising:
a processor; and
logic integrated with the processor, executable by the processor, or integrated with and executable by the processor, the logic being configured to perform the method of claim 1.

7. The system of claim 6, wherein the direct communications connection includes a hardwired communications connection running directly between the first and second device with no intermediary devices between the first device and the second device.

8. A computer-implemented method, comprising:
identifying that a direct communications connection exists between a first device and a second device; and
optimizing information transmitted between the first device and the second device over the direct communications connection by determining one or more fields to be added by the first device to data transmitted from the first device to the second device via the direct communications connection and subsequently removed from the data received by the second device via the direct communications connection,
wherein in response to identifying the direct communications connection, the first device and the second device perform one or more handshaking operations, and during the handshaking operations, the first device and the second device determine which fields the first device is to add to data communicated to the second device via the direct communications connection, and which fields the first device is to omit from data communicated to the second device via the direct communications connection.

9. The computer-implemented method of claim 8, wherein during the handshaking operations, the first device and the second device determine that only information necessary for the direct communications connection is to be added to data communicated between the first device and the second device via the direct communications connection, and information utilized only for an indirect communications connection is omitted from the data communicated between the first device and the second device via the direct communications connection.

10. The computer-implemented method of claim 9, wherein during the handshaking operations, the first device and the second device determine that the information utilized only for an indirect communications connection includes routing information, addressing information, fragmentation information, new timestamp information, security information, source and/or destination address information, and checksum information.

11. A system, comprising:
a processor; and
logic integrated with the processor, executable by the processor, or integrated with and executable by the processor, the logic being configured to perform the method of claim 8.

12. A computer program product comprising one or more computer readable storage media, and program instructions collectively stored on the one or more computer readable storage media, the program instructions comprising instructions configured to cause one or more processors to perform the method of claim 8.

13. A computer program product comprising one or more computer readable storage media, and program instructions collectively stored on the one or more computer readable storage media, the program instructions comprising instructions configured to cause one or more processors to perform a method comprising:
identifying, by the one or more processors, that a direct communications connection exists between a first device and a second device; and
optimizing, by the one or more processors, information transmitted between the first device and the second device over the direct communications connection, wherein optimizing the information that is transmitted includes:
  determining, by the one or more processors, one or more fields to be added by the first device to data transmitted from the first device to the second device via the direct communications connection and subsequently removed from the data received by the second device via the direct communications connection, and
  determining, by the one or more processors, one or more fields to be omitted from data transmitted from the first device to the second device via the direct communications connection.

14. The computer program product of claim 13, wherein the direct communications connection includes a hardwired communications connection running directly between the first and second device with no intermediary devices between the first device and the second device.

15. The computer program product of claim 13, wherein the direct communications connection is determined by identifying and comparing identifiers of communications cable end points.

16. The computer program product of claim 13, wherein the direct communications connection is determined by calculating a network distance between the first device and the second device.

17. The computer program product of claim 13, further comprising transmitting data from the first device to the second device over the direct communications connection, utilizing the optimized information.

18. The computer program product of claim 13, wherein in response to identifying the direct communications connection, the first device and the second device perform one or more handshaking operations, and during the handshaking operations, the first device and the second device determine which fields the first device is to add to data communicated to the second device via the direct communications connection, and which fields the first device is to omit from data communicated to the second device via the direct communications connection.

19. The computer program product of claim 18, wherein during the handshaking operations, the first device and the second device determine that only information necessary for the direct communications connection is to be added to data communicated between the first device and the second device via the direct communications connection, and information utilized only for an indirect communications connection is omitted from the data communicated between the first device and the second device via the direct communications connection.

20. The computer program product of claim 19, wherein during the handshaking operations, the first device and the second device determine that the information utilized only for an indirect communications connection includes routing information, addressing information, fragmentation information, new timestamp information, security information, source and/or destination address information, and checksum information.

* * * * *